(12) United States Patent
Takahashi et al.

(10) Patent No.: US 12,472,922 B2
(45) Date of Patent: Nov. 18, 2025

(54) DRIVING SUPPORT DEVICE

(71) Applicant: TOYOTA JIDOSHA KABUSHIKI KAISHA, Toyota (JP)

(72) Inventors: Yuki Takahashi, Sunto-gun Shizuoka-ken (JP); Hirokazu Ito, Sunto-gun Shizuoka-ken (JP); Hiroshi Oyagi, Kyoto (JP); Shinya Shiratori, Susono (JP); Norimi Asahara, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 66 days.

(21) Appl. No.: 18/540,284

(22) Filed: Dec. 14, 2023

(65) Prior Publication Data

US 2024/0208482 A1   Jun. 27, 2024

(30) Foreign Application Priority Data

Dec. 23, 2022   (JP) .................................. 2022-207310

(51) Int. Cl.
   *B60W 10/22*   (2006.01)
   *B60W 40/08*   (2012.01)
   (Continued)

(52) U.S. Cl.
   CPC ............ *B60W 10/22* (2013.01); *B60W 40/08* (2013.01); *B60W 50/0098* (2013.01);
   (Continued)

(58) Field of Classification Search
   CPC ...... G06N 3/045; B60W 40/08; B60W 10/22; B60W 30/025; B60W 50/0098; B60W 2050/009; B60W 2710/226; B60W 2540/22; B60W 2420/403; B60W 2540/227; B60W 2540/047;
   (Continued)

(56) References Cited

U.S. PATENT DOCUMENTS 11,021,165 B2 *   6/2021   Noguchi ................. H04W 4/40
11,697,431 B2 *   7/2023   Goto ..................... B60W 50/06
                                                                701/26
(Continued)

FOREIGN PATENT DOCUMENTS

JP   2013-216241 A   10/2013
JP   2016-137200 A    8/2016
(Continued)

*Primary Examiner* — Hai H Huynh
*Assistant Examiner* — Johnny H Hoang
(74) *Attorney, Agent, or Firm* — Dinsmore & Shohl LLP

(57) ABSTRACT

A driving support device, in a mobile body having a plurality of seating positions, includes a processor to set a priority order for seating positions when performing improvement control with respect to emotion of an occupant, acquire a captured image and/or biometric information of the occupant, input thereof to a learning model, and output an emotion estimation result of the occupant, select, in accordance with the priority order, an occupant who is seated in a seated position in which the priority order is set to be high, determine the improvement control for the mobile body based on the emotion estimation result of the selected occupant, and control the mobile body based on the determined improvement control.

5 Claims, 4 Drawing Sheets

(51) Int. Cl.
*B60W 50/00* (2006.01)
*G06V 10/82* (2022.01)
*G06V 20/59* (2022.01)
*G06V 40/16* (2022.01)

(52) U.S. Cl.
CPC .............. *G06V 10/82* (2022.01); *G06V 20/59* (2022.01); *G06V 40/174* (2022.01); *B60W 2040/0827* (2013.01); *B60W 2050/009* (2013.01); *B60W 2420/403* (2013.01); *B60W 2540/221* (2020.02); *B60W 2710/226* (2013.01)

(58) Field of Classification Search
CPC ... B60W 2050/0088; B60W 2540/221; B60W 2040/0827; G06V 20/597; G06V 40/174; G06V 10/82; G06V 20/59; B60N 2/90; B60N 2/0244; B60N 2/002; B60N 2/0268
See application file for complete search history.

(56) References Cited

U.S. PATENT DOCUMENTS

| | | | |
|---|---|---|---|
| 2014/0171752 A1* | 6/2014 | Park | A61B 5/165 600/301 |
| 2015/0078632 A1* | 3/2015 | Hachisuka | A61B 5/743 382/118 |
| 2016/0378112 A1* | 12/2016 | Ljubuncic | B60W 30/16 701/45 |
| 2022/0315024 A1* | 10/2022 | Pusheck | B60W 30/18027 |

FOREIGN PATENT DOCUMENTS

| | | |
|---|---|---|
| JP | 2019-131147 A | 8/2019 |
| WO | 2018/138926 A1 | 8/2018 |

* cited by examiner

DRIVING SUPPORT DEVICE

CROSS-REFERENCE TO RELATED APPLICATION(S)

The present application claims priority to and incorporates by reference the entire contents of Japanese Patent Application No. 2022-207310 filed in Japan on Dec. 23, 2022.

BACKGROUND

The present disclosure relates to a driving support device.

Japanese Laid-open Patent Publication No. 2013-216241 discloses a technique for displaying occupant emotion for each seating position.

SUMMARY

There is a need to provide a driving assistance device that can improve occupant emotion from discomfort by giving priority to the occupant's emotion of the seated position, which is likely to cause unpleasant emotion.

A driving support device, provided in a mobile body having a plurality of seating positions, includes a processor to set a priority order with respect to the plurality of seating positions when performing improvement control of the mobile body with respect to emotion of an occupant on the mobile body, acquire at least one of a captured image and biometric information of the occupant, input thereof to a learning model as an input parameter, and output an emotion estimation result of the occupant as an output parameter, select, in accordance with the priority order with respect to the plurality of seating positions, an occupant who is seated in a seated position in which the priority order is set to be high among occupants who are desired to be treated under improvement control, determine the improvement control with respect to the mobile body based on the emotion estimation result of the selected occupant, and control the mobile body based on the determined improvement control.

DETAILED DESCRIPTION

Figure 1:
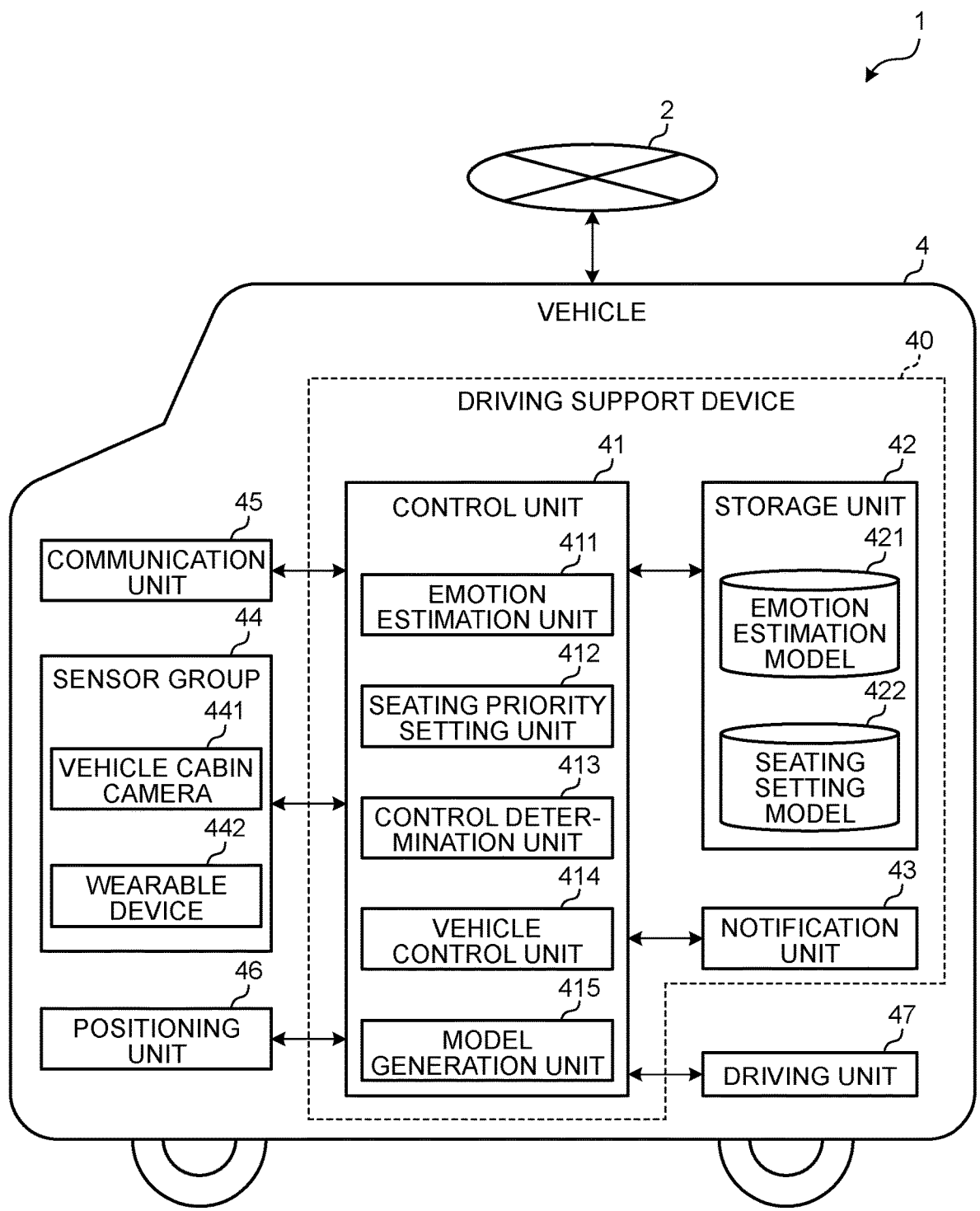
FIG. 1 is a block diagram illustrating a driving support system according to an embodiment.

In the technology described in Japanese Laid-open Patent Publication No. 2013-216241, there is no consideration about which emotion is improved when there are a plurality of occupants. Therefore, it was unclear which vehicle control is performed based on the emotion of the occupant. From this fact, the technology which can decide which occupant's emotion is given priority was required.

Hereinafter, embodiments of the present disclosure will be described with reference to the accompanying drawings. Incidentally, in the entire drawing of one embodiment below, the same or corresponding parts are denoted by the same reference numerals. In addition, the present disclosure is not limited by the embodiments described below.

In an embodiment of the present disclosure, in a vehicle as a moving object traveling on a road, an emotion of an occupant appearing in the vehicle is estimated using a learning model. The learning model may be simply referred to as a trained model, a studied model, or a model. In the present exemplary embodiment, the priority of the vehicle control for the improvement is set according to the seating position when the vehicle control for improving the emotion of the occupant is performed.

A driving support device mounted on the vehicle as a moving body includes a control unit. The control unit has an emotion estimation unit composed of a learning model. The emotion estimation unit functions as a processing unit that estimates and determines at least the comfort and discomfort of the driver's emotion based on the facial expression of the occupant including the driver, and vital information such as heartbeat and perspiration. The emotion estimated by the emotion estimating unit may be, for example, three stages. Three-stage emotions include, for example, three stages: bogitic (comfort), negative (discomfort), and normal. The emotion estimated by the emotion estimation unit may be, for example, four stages or more. In the case of four or more stages of emotion, at least vogitive (comfortable) and negative (unpleasant) emotions are included. The level at which the emotion hierarchy is set can be changed as appropriate.

The estimation result of the emotion estimation unit in the driving support device may include a numerical index of discomfort, a probability for a specific emotion (sleepiness, carsick, etc.), and the like. The emotion estimation unit can estimate emotion based on image data captured by a camera, for example.

The control unit has a seating priority setting unit composed of a learning model or a rule base. The seating priority setting unit functions as a setting unit that sets a priority regarding a seating position of an occupant on the vehicle based on information (emotion estimation result information) of the emotion estimation result generated by the emotion estimation unit. The control unit has a vehicle control unit made of, for example, an ECU. The vehicle control unit outputs a control signal for controlling the vehicle to each unit according to the vehicle control parameters. The control unit includes a control determination unit that determines the control contents of the vehicle by the vehicle control unit. The control determining unit is a determining unit that determines the control based on the emotion estimation result information of the occupant riding in the position prioritized selected by the seating priority setting unit. The vehicle control unit, when the determination information determined by the control determination unit is input, transmits a signal based on the determined control to each section of the vehicle to control the vehicle. That is, the control contents of the vehicle by the vehicle control unit is changed in accordance with the emotion of the occupant in which the priority is set without being controlled to be fixed. The emotion estimation unit may perform emotion estimation based on both the image data obtained by imaging the expression of the occupant and the biological data of the occupant. The emotion estimation may be performed based on both the image data (expression) of the occupant and the biological data.

Next, a driving support system that supports driving of a mobile body with a driving support device according to an embodiment of the present disclosure based on the above-described principles will be described. FIG. 1 illustrates a driving assistance system according to an embodiment. FIG. 1 is a block diagram showing a driving support system 1 according to an embodiment.

As illustrated in FIG. 1, the driving support system 1 is configured to have a vehicle 4 capable of transmitting and receiving information can communicate with the outside via the network 2. The vehicle 4 can output information related to emotion to the network 2 by a driving support device 40 mounted thereon. The network 2 includes of an Internet network and a cellular telephone network. The network 2 may include, for example, a public communication network, such as the Internet, a Wide Area Network (WAN), a telephone communication network, such as a cellular telephone, or another communication network, such as a radio communication network, such as a WiFi (registered trademark).

The vehicle 4 as a mobile capable of communicating with the vehicle network 2 can be employed a vehicle that travels by driving by a driver. Incidentally, it may be adopted a semi-automatic driving type or automatic driving type vehicle 4 capable of autonomous running in accordance with a travel command given by a predetermined program or the like as the vehicle 4. The vehicle 4 can be moved toward a desired destination by the user or the user on board by operating a steering or the like. In addition, a moving body other than the vehicle 4 may be employed. Moving objects other than the vehicle 4 include light vehicles such as motorcycles and those moving on other roads. That is, in the present embodiment, the motorcycle, a motorcycle, such as a bicycle or kick board, a motorcycle, a triple, a bus, and a truck, for example, with a motor and a battery, may also be adopted.

The vehicle 4 includes a driving support device 40 as an information processing apparatus that is a mounted apparatus, a sensor group 44, a communication unit 45, a positioning unit 46, and a driving unit 47. The driving support device 40 includes a control unit 41, a storage unit 42, and a notification unit 43. The driving support device 40 has a typical computer configuration that can communicate via network 2. The driving support device 40 is a vehicle-mounted device mounted on the vehicle 4. The driving support device 40 can communicate with the sensor group 44, the communication unit 45, the positioning unit 46, and the driving unit 47 in the vehicle. The sensor group 44 is configured with a vehicle cabin camera 441 and a wearable device 442.

The control unit 41 having hardware specifically includes a processor such as a Central Processing Unit (CPU), a Digital Signal Processor (DSP), and a Field-Programmable Gate Array (FPGA), and a main storage unit such as a Random Access Memory (RAM) and a Read Only Memory (ROM).

The control unit 41 comprehensively controls the operation of the various components mounted on the vehicle 4. The control section 41 further loads and executes a program stored in the storage unit 42 into a work area of the main storage section, and can realize functions of an emotion estimation unit 411, a seating priority setting unit 412, a control determination unit 413, a vehicle control unit 414, and a model generation unit 415 through execution of the program.

The storage unit 42 is composed of a storage medium selected from an Erasable Programmable ROM (EPROM), a hard disk drive (HDD), and a removable medium. The removable media includes, for example, a Universal Serial Bus (USB) memory or a disk recording medium. The disc recording media can be a Compact Disc (CD), a Digital Versatile Disc (DVD), or a Blu-ray registered trademark) Disc (BD). The storage unit 42 may store various programs, various tables, and various databases. Various programs are, for example, operating systems (Operating System: OS).

The control unit 41 loads and executes the program stored in the storage unit 42 to the work area of the main storage unit. The control unit 41 can realize various functions of the control unit 41 through the execution of the program. Specifically, the control section 41 can realize the functions of the emotion estimation section 411, the seating priority setting unit 412, the control determination unit 413, the vehicle control unit 414, and the model generation unit 415 through the execution of the program.

An emotion estimation model 421 for realizing the emotion estimation unit 411 is stored in the storage unit 42. The emotion estimation unit 411 of the control unit 41 estimates the emotion of the occupant using various information acquired from the sensor group 44 of the vehicle 4, here, image data or vital data. The emotion estimation unit 411 estimates whether the occupant is negative emotion using the emotion estimation model 421. The emotion estimation unit 411 can perform emotion estimation such as an occupant on the basis of the emotion estimation model 421 that is a learning model or a learned model that is previously learned by machine learning. When the emotion estimation model 421 is used, the input parameters are, for example, image data of an occupant or vital data of an occupant. The output parameter is, for example, a probability value of occupant discomfort. That is, the emotion estimation unit 411 is configured to determine the emotion of the occupant by AI (Artificial Intelligence) using the training model from the captured image data of the occupant obtained by imaging the vehicle 4 and the vital data including the biometric information of the occupant measured by the sensor group 44. Along with this, the emotion estimation unit 411 can estimate while prioritizing the emotion of the occupant from the captured image data and vital data of the occupant in accordance with the priority.

In the storage unit 42, a seating setting model 422 for realizing the seating priority setting unit 412 is stored. The seating priority setting unit 412 sets the priority of the seating position based on the seating position of the user in the vehicle 4's cabin using the seating setting model 422. The seating priority setting unit 412 can set the priority of the seating position based on the seating setting model 422. The seat setting model 422 is a learning model or a learned model pre-learned by machine learning. In the case of using the seating setting model, the input parameter is, for example, an estimation result of emotion of an occupant (emotion estimation result). The output parameter is, for example, rank information of changes in emotion for each position of a seat in a vehicle interior. The seating priority setting unit 412 may be configured to set the priority by rule base.

The control determination unit 413 determines the control for the driving unit 47. The vehicle control unit 414 comprehensively controls the operation of various components mounted on the vehicle 4. Specifically, the vehicle control section 414 includes an ECU (Electronic Control Unit) that controls components such as an engine, an electric motor, and a steering device in the vehicle 4, and is configured to be capable of controlling the vehicle speed, the steering angle, and the like of the vehicle 4. The vehicle control unit 414 controls the vehicle speed by adjusting the throttle opening degree of the engine or the braking force of the brake. The vehicle control unit 414 steers the vehicle 4 by adjusting the steering angle of wheels that rotate during traveling. With this configuration, the vehicle control unit 414 performs control for the driving unit 47 of the vehicle 4 based on the control determined by the control determination unit 413.

The model generation unit 415 generates the emotion estimation model 421 or the seating setting model 422 that is a learning model by machine learning. The learned model or the learning model can be generated by machine learning such as deep learning using a neural network, for example, using an input/output data set between a predetermined input parameter and an output parameter as teacher data. For example, in supervised learning that generates the seating setting model 422, the emotion estimation result of the user is used as the input parameter for learning, and the priority of the seating position is used as the output parameter for learning.

The model generation unit 415 can generate the seating setting model 422 using these input and output data sets as the teacher data.

The sensor group 44 has the vehicle cabin camera 441 that can image various situations in the cabin, for example.

The sensor group 44 also includes the wearable device 442 to be worn by an occupant riding on the vehicle 4. The wearable device 442 senses an occupant condition by sensing vital information such as an occupant's body temperature, pulse, an EEG, blood pressure, and perspiration states. Detected vital information is output to the driving support device 40. The sensor group 44 may further include sensors for traveling of the vehicle 4, such as a vehicle speed sensor, an acceleration sensor, or a fuel sensor. Sensor information detected by the vehicle cabin camera 441 and the wearable device 442 and various sensors constituting the sensor group 44 is outputted to the driving support device 40 via a vehicle information network (Control Area Network: CAN) configured from a transmission path connected to the various sensors.

The positioning unit 46 serving as a position information acquiring section detects the position of the vehicles 4 by receiving radio waves from GPS satellites by Global Positioning System (GPS) sensors. The detected position and the travel path is retrievably stored in the storage unit 42 as information of the position information and the travel path in the travel information.

The sensor group 44 and the positioning unit 46 sequentially output various information to the driving support device 40 at any time or at a predetermined timing. Vehicle information as moving object information of various information includes vehicle identification information and sensor information. The sensor information of the various information includes imaging information obtained by imaging the occupant of the vehicle 4 in the cabin. The travel information as the movement information among the various information includes information related to the travel such as the travel route and the position information as the movement route of the vehicle 4. The user information includes user identification information and personal information. The user identification information may include information for identifying users, such as a driver of the vehicle 4 and an occupant on the vehicle 4, from each other. Although the users that are subject to emotion monitoring are crew members other than the driver, it is also possible to include the driver in the users that are subject to emotion monitoring. The user state information, for example, information about the emotion of the user. The personal information includes, as information about the user itself, for example, name, age, address, birth date, and user individual information such as age, and behavior pattern information such as driving history. The above-described information is not necessarily limited to the illustrated information.

The driving unit 47 is composed of a plurality of driving devices necessary for the travel of the vehicle 4. Specifically, the vehicle 4 includes an engine as a driving source, the engine is configured to be able to generate electricity using an electric motor or the like by driving by the combustion of fuel. The generated power is charged into a rechargeable battery. Further, the vehicle 4 includes a drive transmission mechanism for transmitting the driving force of the engine, and a driving wheel for traveling, etc.

The notification unit 43 is configured to be able to notify the user of the predetermined information in the vehicle interior. The communication unit 45 transmits various information to an external, for example, a server or other vehicle 4 via the network 2. The map database stored in the storage unit 42, the notification unit 43, the communication unit 45, and the positioning unit 46 constitute a car navigation system.

Figure 2:
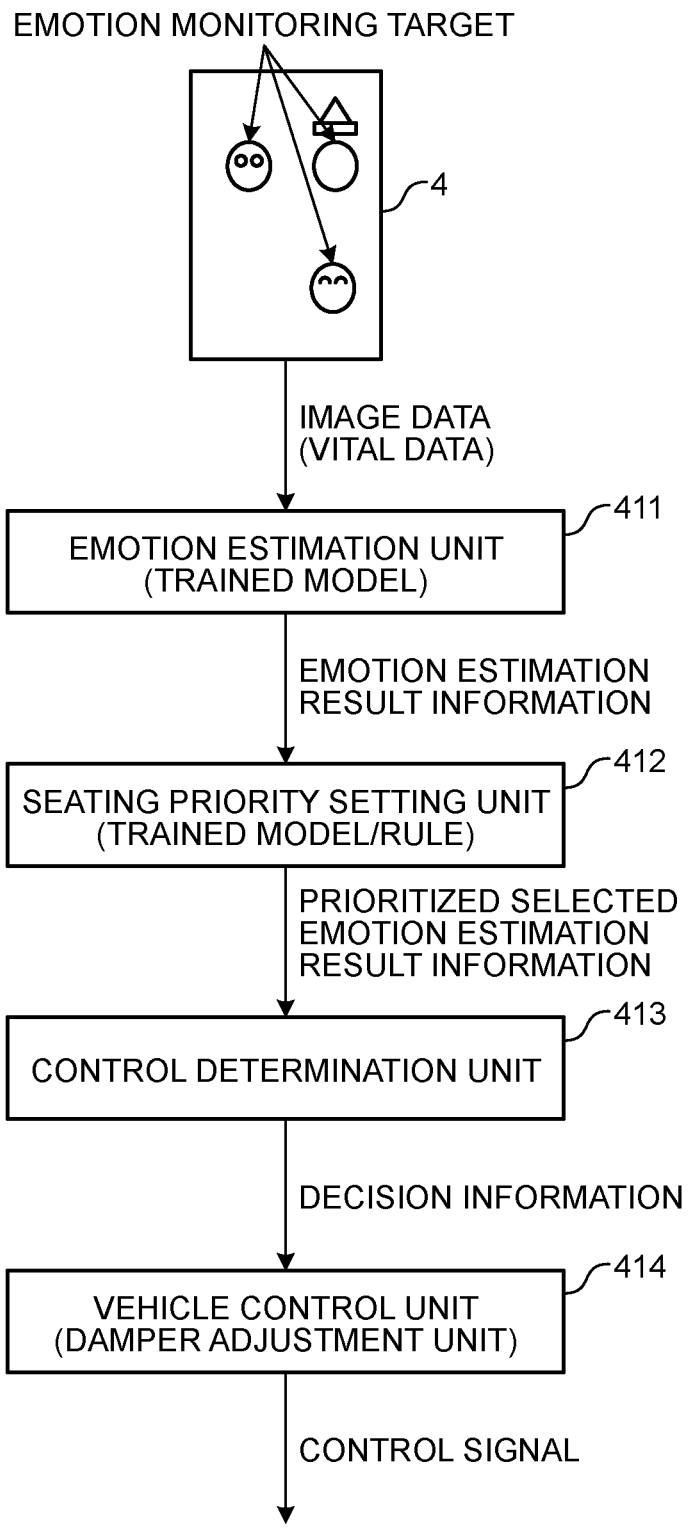
FIG. 2 is a diagram for explaining a flow of determining a priority of an occupant of a vehicle in a driving support system according to an embodiment.
Figure 3:
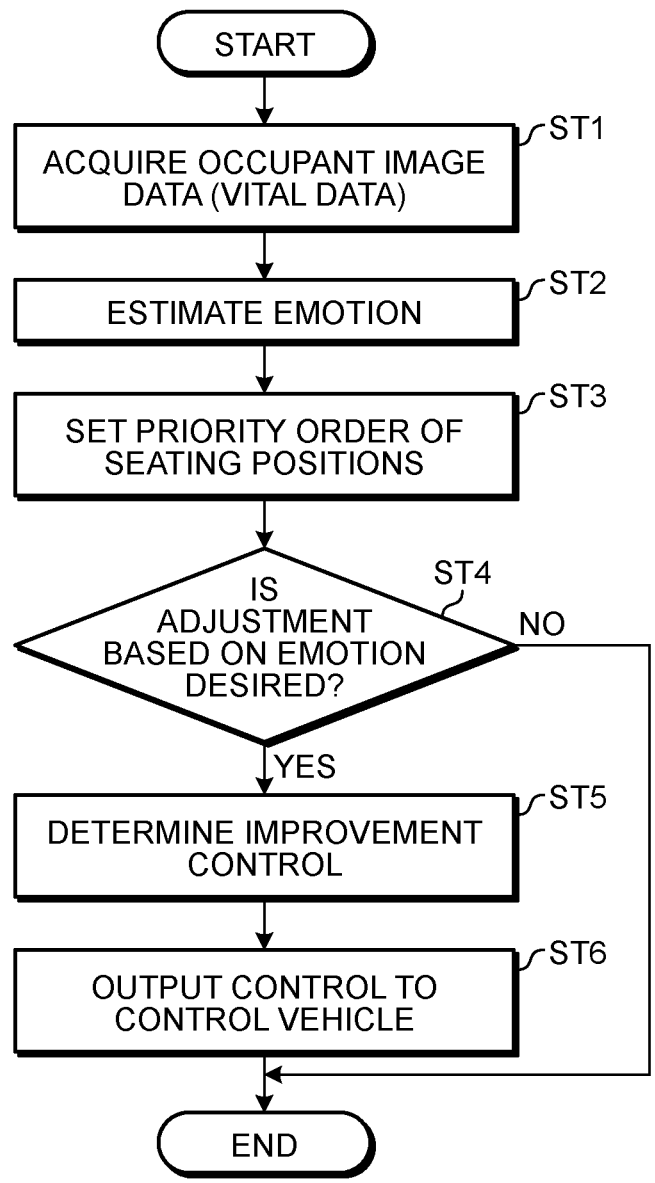
FIG. 3 is a flowchart for explaining an information processing method executed in a vehicle according to an embodiment.

Next, a method of controlling the vehicle based on the priority of the seating position will be described information processing method executed by the driving support system 1 described above. The information processing method according to the present embodiment is a control method of a vehicle based on a seating position. FIG. 2 is a diagram for explaining a flow of controlling the vehicle 4 by estimating the emotion of the occupant of the vehicle 4 in the driving support system 1 according to the present embodiment. FIG. 3 is a flowchart for explaining an information processing method according to the present exemplary embodiment. In the following description is used together with FIGS. 2 and 3. Further, the flowchart shown in FIG. 3, while the occupant is appearing in the vehicle 4 is repeatedly executed.

That is, as illustrated in FIGS. 2 and 3, first, the vehicle cabin camera 441 of the sensor group 44 of the vehicle 4 in step ST1 captures an image of an occupant or the like in the vehicle 4 cabin. The sensor group 44 outputs the captured image data to the control unit 41. Similarly, the wearable device 442 of sensor group 44 measures biometric information, such as an occupant. The wearable device 442 outputs the measured biological information as vital data to the control unit 41. The control unit 41 stores the acquired image data and vital data in the storage unit 42.

Next, the emotion estimation unit 411 of the control unit 41 proceeds to step ST2 to read the image data, the vital data, and the emotion estimation model 421 from the storage unit 42. The emotion estimation unit 411 inputs the read image data and the vital data to the emotion estimation model 421. The emotion estimating unit 411 outputs the information (the emotion estimation result information) that has become the emotion that has changed from the comfort to the discomfort among the emotion estimation results by the emotion estimation model 421. That is, the emotion estimation unit 411 outputs the emotion estimation result information on the change of the estimated emotion based on the image data or the vital data to the seating priority setting unit 412.

Next, the process proceeds to the step ST3, and the seating priority setting unit 412 of the control unit 41 executes the setting of the priority of the seating position in the vehicle interior based on the information of the emotion estimation result acquired from the emotion estimating unit 411. That is, the seating priority setting unit 412 decides the position where the occupant on the vehicle 4 is seated based on the image data based on the emotion estimation result information and sets the priority for the decided seating position.

Figure 4:
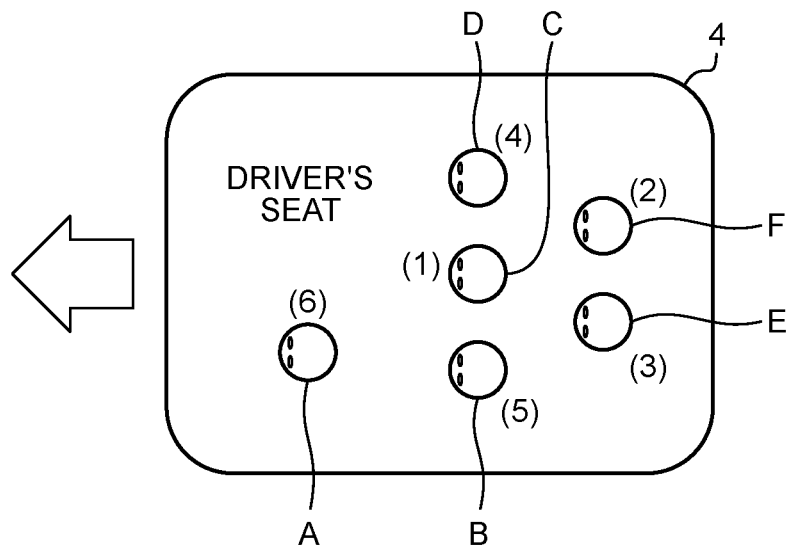
FIG. 4 is a diagram illustrating a first embodiment of a method of setting a priority according to an information processing method according to an embodiment.
Figure 5:
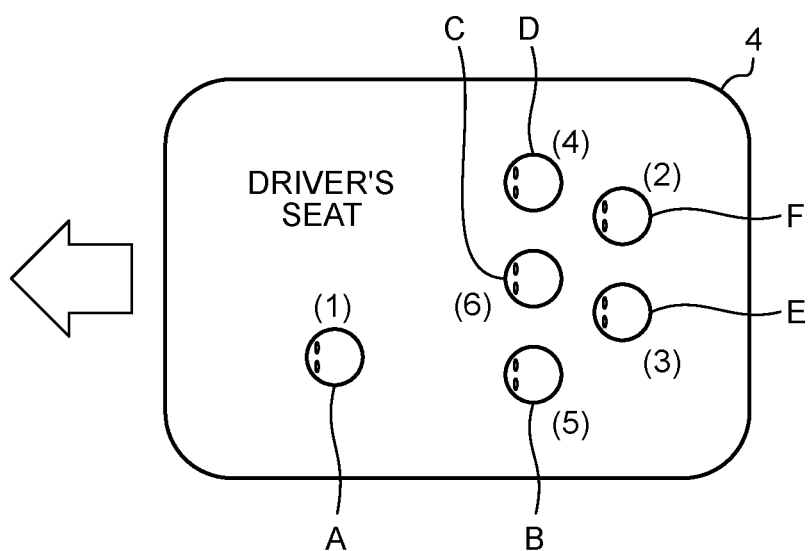
FIG. 5 is a diagram illustrating another example of the first embodiment in the method of setting the priority according to the information processing method according to an embodiment.

Here, examples of priority will be described with reference to FIGS. 4 and 5. FIG. 4 and FIG. 5 are diagrams illustrating the first embodiment relating to the setting of the priority in the information processing method according to an embodiment.

In the first embodiment, the priority is set based on the so-called upper seat or lower seat point of view. In this case, the seating priority setting unit 412 can set the priority for a plurality of seating positions by the rule base. That is, as shown in FIG. 4, in the first embodiment, the seating priority setting unit 412 sets the priority of the seating position of the central user C when the second row of the three seats is the third seat to be high (priority (1)) with respect to the seating positions of the user A and B, C, D, E, F, and then sets the priority of the adhering position of the user F (priority (2)) and E (priority (3)) of the last row of seats to be high. Incidentally, it may be the opposite. Further, the seating priority setting unit 412 sets a priority order (6) for the user A, a priority order (5) for the user B, and a priority order (4) for the user D, respectively, for the seating position of the other user A, B, and D. When the seating priority setting unit 412 functions according to the rule base, the priority order can be set in advance.

Further, for example, when the vehicle 4 is a taxi or the like, as illustrated in FIG. 5, the seating priority setting unit 412 may set the priority of the user A of the passenger seat to be higher (priority (1)) with respect to the seating position of the user A and B, C, D, E, F, and then set the user F of the last seat (priority (2)) and E (priority (3)) to be higher. Incidentally, it may be the opposite. Further, the seating priority setting unit 412 can set the user B in the order of priority (5), the user C in the order of priority (6), and the user D in the order of priority (4), respectively, for the seating position of the other user B, C, and D.

It is also possible to generate a seating setting model 422 by which the model generation unit 415 sets priorities for a plurality of the occupation values based on the emotion estimation result for each riding opportunity of the occupant. In this case, the information of the change of emotion by the emotion estimation result information of each occupant is used as the input parameter for learning. In addition, the priority in the execution of the countermeasure for each occupant is set as the output parameter for learning. The model generation unit 415 can generate the seating setting model 422 by machine learning such as deep learning using the input/output data set for learning of the learning input parameters and the learning output parameters. That is, the priority of the seating position can be set by correlating the seating position with the occupant by setting the priority of execution of the countermeasure to the occupant.

In the second embodiment, the seating priority setting unit 412 sets the priority in accordance with the type of the seat of the user's seating position. That is, when the normal seat and the auxiliary seat coexist in the vehicle 4 cabin, the priority of the seating position of the auxiliary seat is set higher. In addition, when a child seat is installed in the vehicle interior, the priority of the seating position of the child seat is set to the highest and the priority (1). When a plurality of child seats are installed in the vehicle interior, the seating priority setting unit 412 sets the priority of the seating positions of the plurality of child seats higher than the priority of the other seating positions, and further sets the priority in the plurality of child seats. In the setting of the priority for the adhesive positions of the plurality of child seats, the priority as described in the first embodiment can be adopted. Furthermore, the seating priority setting unit 412 can set the priority based on the birth year and month of the infant using the child seat.

It is also possible to combine the first embodiment and second embodiment. That is, the seating priority setting unit 412 can also determine the priority of the seating position by multiplying the priority at the seating position according to the first embodiment by the priority based on the type of the seat according to the second embodiment. In addition, the priority at the seating position and the priority based on the type of the seat may be multiplied by changing the weighting.

Return to FIGS. 2 and 3, after the seating priority setting unit 412 sets the priority in step ST3, the seating priority setting unit 412 outputs the emotion estimation result information prioritized (information after prioritizing the emotion estimation result information) to the control determination unit 413. Thereafter, the control process proceeds to step ST4.

In step ST4, the control determination unit 413 determines, for each occupant according to the priority, whether or not adjustment (improvement control) based on the emotion of the occupant is required in the traveling of the vehicle 4 based on the emotion estimation result information regarding the occupant in the seating position in which the priority is set high. When the control determination unit 413 determines that there is no need to take measures for any occupant and improved control for the vehicle 4 is not required (step ST4: No), the control process according to the present exemplary embodiment ends.

On the other hand, the control determination unit 413 determines the emotion estimation result information in order from the higher priority in the step ST4, and needs to cope with at least one occupant, and when it is determined that the improved control is also required (step ST4: Yes), the process proceeds to step ST5.

In step ST5, the control determination unit 413 determines the type of the improved control based on the emotion estimation result information regarding the occupant whose priority order is relatively high and needs to be dealt with. Specifically, when the emotion of the occupant includes the emotion of drowsiness, a control to reduce the damping force of the damper in the driving unit 47 of the vehicle 4 is selected as the improvement control. Thus, it is possible to improve the riding comfort of the vehicle 4 to a fluffy state.

Also, specifically, for example, there are cases where the emotion of an occupant whose priority is relatively high and needs to be coped with includes the emotion of motion sickness. In this case, in the traveling vehicle 4, to select the control to reduce the vibration transmission rate by increasing the damping force of the damper in the driving unit 47 of the vehicle 4 as the improvement control. That is, in the vehicle 4, in addition to the vibration of the engine of the driving unit 47, the vertical vibration of the suspension including the vertical resonance of the spring of the vehicle body (about 1 to 2 Hz) and the vertical resonance of the spring (about 14 Hz) is generated. The resonant frequency band of the suspension-up-and-down vibration, in particular the frequency band of the spring-down up-and-down resonance, is included in the vibrational frequency band (4 Hz~14 Hz) where human sensitivity is relatively high. Since the frequency band of the up-and-down resonance affects the riding comfort of the user, as an improvement control, the damping characteristics of the absorber equipped in the suspension are controlled so that the damping effect becomes high in the resonance frequency band of the up-and-down vibration of the suspension. Thus, it is possible to improve the ride comfort by suppressing the vibration of the resonance frequency band.

Thereafter, the process proceeds to step ST6 and the control determination unit 413 outputs the determined type of improved control to the vehicle control unit 414 as the determination info. The vehicle control unit 414 executes improvement control in the travel of the vehicle 4 by controlling the driving unit 47 based on the input determination information. Thus, the control process according to the present embodiment is completed.

According to an embodiment of the present disclosure described above, it is possible to improve the emotion of an occupant from discomfort by giving priority to the emotion of an occupant in a sitting position in which discomfort is likely to occur.

Although the embodiments of the present disclosure have been described specifically, the present disclosure is not limited to the above-described embodiments, and various modifications based on the technical philosophy of the present disclosure and embodiments that combine mutual embodiments can be adopted. For example, the input and output data sets and the teacher data listed in the above-described embodiment are only examples, and may use input and output data sets and the teacher data different from the above-described embodiment as required.

For example, in the above-described embodiment, a method of constructing a learning model by the model generation unit 415 is not particularly limited, and various machine learning methods such as a deep learning using a neural network, a support vector machine, a decision tree, a simple Bayesian, and a k neighborhood method can be used. Also, semi-supervised learning may be used instead of supervised learning. Furthermore, reinforcement learning or deep reinforcement learning may be used as machine learning.

The emotion estimation model 421 and the seating setting model 422 may be generated outside the vehicle 4. When generating outside the vehicle 4, for example, a server installed outside the vehicle 4 may generate the emotion estimation model 421 and the seating setting model 422. In this case, the vehicle 4 acquires the emotion estimation model 421 and the seating setting model 422 through the wireless communication with the server. The emotion estimation model 421 and the seating setting model 422 acquired from the server are stored in the storage unit 42. Further, since the emotion estimation model 421 and the seating setting model 422 are stored in the storage unit 42, the emotion estimation model 421 and the seating setting model 422 can be updated to the latest information.

As another embodiment, it is also possible to divide the functions of the control unit 41, the storage unit 42, the emotion estimation unit 411, the seating priority setting unit 412, the control determination unit 413, the vehicle control unit 414, and the model generation unit 415 by a plurality of devices capable of communicating through the network 2 with each other. For example, at least a portion of the functions of the control unit 41 may be executed in the first device having a first processor. The function of the emotion estimation unit 411 may be executed in the second device having the second processor. The function of the seating priority setting unit 412 may be executed in the third device having the third processor. The function of the model generation unit 415 may be performed in a fourth device having a fourth processor. Here, each of the first to fourth devices may be configured to send and receive information from each other via a network 2 or the like. In this case, at least one of the first to fourth devices, for example, at least one of the first device and the second device, may be mounted on the vehicle 4.

In the above-described embodiment of the recording medium, a program capable of executing a processing method by the driving support device 40 or the driving support device 40 can be recorded in a recording medium that can be read by a computer or other machine or device (hereinafter, a computer or the like). A computer or the like, by causing the program of the recording medium to be read and executed, the computer or the like functions as a control unit 41 of the control unit 41 and the vehicle 4 of the driving support device 40. Here, a recording medium that can be read by a computer or the like refers to a non-temporary recording medium that can store information such as data or programs by electrical, magnetic, optical, mechanical, or chemical action and can be read from a computer or the like. Among such recording media, removable from a computer or the like includes, for example, a memory card such as a flexible disk, a magnetic optical disk, a CD-ROM, a CD-R/W, a Digital Versatile Disk (DVD), a BD, DAT, a magnetic tape, a flash memory, and the like. Hard disks, a ROM, and the like are fixed to a computer or the like as recording media. In addition, SSD can be used as a removable recording medium such as a computer or a recording medium fixed to a computer.

Further, in the vehicle 4 and the driving support device 40 according to an embodiment, the "unit" can be read as a circuit. For example, the communication unit can be read as a communication circuit. Further, the program to be executed by the driving support device 40 and the vehicle 4 according to an embodiment may be configured to be provided by storing on a computer connected to a network such as the Internet and downloading it via the network.

According to the present disclosure, it is possible to improve the emotion of the occupant from discomfort by giving priority to the emotion of the occupant in the sitting position in which the uncomfortable emotion is likely to occur.

Further effects and variations can be readily derived by one skilled in the art.

The broader aspects of the present disclosure are not limited to the specific details and representative embodiments represented and described above.

Accordingly, various modifications are possible without departing from the spirit or scope of the overall concept defined by the appended claims and their equivalents.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A driving support device, provided in a mobile body having a plurality of seating positions, comprising a processor,
wherein the processor is configured to;
set a priority order regarding a seating position with respect to the plurality of seating positions when performing improvement control of the mobile body with respect to emotion of an occupant on the mobile body,
acquire at least one of a captured image and biometric information of the occupant, input thereof to a learning model as an input parameter, and output an emotion estimation result of the occupant as an output parameter, select, in accordance with the priority order with respect to the plurality of seating positions, an occupant who is seated in a seated position having a highest priority, based on the priority order, among occupants who are desired to be treated under improvement control, determine the improvement control with respect to the mobile body based on the emotion estimation result of the selected occupant, and control the mobile body based on the determined improvement control.

2. The driving support device according to claim 1, wherein the processor is configured to set the priority order of the seating position high when the seating position is one of a center position in three seats, a position in the last row in three row seats, and an auxiliary seat.

3. The driving support device according to claim 1, wherein the processor is configured to select, when the emotion estimation result of the occupant includes a feeling of drowsiness, control for reducing a damping force of a damper of the mobile body as the improvement control.

4. The driving support device according to claim 1, wherein the processor is configured to, when the emotion estimation result of the occupant includes an emotion of carsick, select control, as the improvement control, to increase a damping force of a damper of the mobile body to reduce a vibration transmission rate.

5. The driving support device according to claim 1, wherein the processor is configured to determine the priority order of the seating position by multiplying the acquired emotion estimation result by a priority level at the seating position and a priority level based on a type of seat.

\* \* \* \* \*